United States Patent
Rachita et al.

(10) Patent No.: US 6,780,948 B2
(45) Date of Patent: Aug. 24, 2004

(54) SYNTHESIS OF POLYISOPRENE WITH NEODYMIUM CATALYST

(75) Inventors: Michael Joseph Rachita, North Canton, OH (US); Zhengfang Xu, Portland, OR (US); Tang Wong, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 93 days.

(21) Appl. No.: 10/368,660

(22) Filed: Feb. 18, 2003

(65) Prior Publication Data

US 2003/0187162 A1 Oct. 2, 2003

Related U.S. Application Data

(60) Provisional application No. 60/434,882, filed on Dec. 18, 2002, and provisional application No. 60/368,227, filed on Mar. 28, 2002.

(51) Int. Cl.$^7$ ............................ C08F 236/08; C08F 4/52
(52) U.S. Cl. ....................... 526/164; 526/335; 502/108; 502/114; 502/132; 502/170
(58) Field of Search ................................ 526/164, 335; 502/108, 114, 132, 170

(56) References Cited

U.S. PATENT DOCUMENTS

| | | | |
|---|---|---|---|
| 3,297,667 A | 1/1967 | Dohlen et al. | 260/82.1 |
| 3,676,441 A | 7/1972 | Nikles | 260/249.8 |
| 3,794,604 A | 2/1974 | Throckmorton et al. | 252/431 |
| 4,242,232 A | 12/1980 | Sylvester et al. | 252/429 |
| 4,260,707 A | 4/1981 | Sylvester et al. | 526/114 |
| 4,429,089 A | 1/1984 | Pedretti et al. | 526/153 |
| 4,444,903 A | 4/1984 | Carbonaro et al. | 502/102 |
| 4,461,883 A | 7/1984 | Takeuchi et al. | 526/139 |
| 4,533,711 A | 8/1985 | Takeuchi et al. | 526/340.4 |
| 4,663,405 A | 5/1987 | Throckmorton | 526/144 |
| 4,696,475 A * | 9/1987 | Tomita et al. | 473/365 |
| 4,699,960 A | 10/1987 | Silvana et al. | 526/81 |
| 5,502,126 A | 3/1996 | Bell et al. | 526/142 |
| 5,659,101 A | 8/1997 | Biagini et al. | 585/601 |
| 5,686,371 A | 11/1997 | Ansell et al. | 502/102 |
| 6,136,931 A | 10/2000 | Jang et al. | 526/133 |
| 6,194,505 B1 * | 2/2001 | Sone et al. | 524/432 |
| 6,255,416 B1 | 7/2001 | Sone et al. | 526/153 |

* cited by examiner

*Primary Examiner*—Caixia Lu
(74) *Attorney, Agent, or Firm*—Alvin T. Rockhill

(57) ABSTRACT

The neodymium catalyst system prepared by the technique of this invention can be used in the polymerization of isoprene monomer into polyisoprene rubber that is clear (transparent) and of high purity. This invention more specifically discloses a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

25 Claims, No Drawings

SYNTHESIS OF POLYISOPRENE WITH NEODYMIUM CATALYST

This application claims the benefit of U.S. Provisional Patent Application Serial No. 60/368,227, filed on Mar. 28, 2002, and U.S. Provisional Patent Application Serial No. 60/434,882, filed on Dec. 18, 2002.

BACKGROUND OF THE INVENTION

Neodymium salts activated with aluminum alkyl co-catalysts catalysts have been known to catalyze the polymerization of conjugated dienes since the early 1960's. To date, many papers and patents have been published which describe variations and improvements to the original systems (see U.S. Pat. Nos. 3,297,667, 3,676,441, and 3,794,604). Much of this work was driven by the eventual commercialization of high cis-polybutadiene in the 1980s for the use in tire applications (see U.S. Pat. Nos. 4,242,232, 4,260,707, 4,699,960, and 4,444,903).

The type of catalyst system employed, and its method of preparation, are crucial to the success of the polymerization. Traditionally, there are two main types of catalyst systems, the first is a ternary system based on soluble neodymium carboxylates in conjunction with an alkylaluminum co-catalyst and a halogen source (see R. P. Quirk, A. M. Kells, K. Yunlu, J.-P. Cuif, *Polymer* 41, 5903 (2000) and A. Pross, P. Marquardt, K. H. Reichert, W. Nentwig, T. Knauf, *Angew. Makromol. Chem.* 211, 89 (1993)). The second system is a binary catalyst comprising of an insoluble neodymium halide complexed with three equivalence of a Lewis base such as an alcohol, amine, or phosphonate and an alkylaluminum activator (see H. Iovu, G. Hubca, E. Simionescu, E. Badea, J. S. Hurst, *Eur. Polymer J.* 33, 811 (1997); H. Iovu, G. Hubca, D. Racoti, J. S. Hurst, *Eur. Polymer J.* 35, 335 (1999); and J. H. Yang, M. Tsutsui, Z. Chen, D. Bergbreiter, *Macromolecules* 15, 230 (1982)).

In general, the two systems behave similarly; however, the ternary system appears to have gained acceptance commercially in the production of polybutadiene (see D. J. Wilson, *J. Polym. Sci., Part A.* 33, 2505 (1995)). Typically, the most active ternary systems consist of treating a branched long chain neodymium carboxylate with branched trialkyl-aluminum or dialkylaluminum hydrides, in an Al/Nd ratio between 10–40/1, and the use of 2–3 equivalents of a halide source, such as diethylaluminum chloride or tert-butylchloride.

The active catalyst is typically prepared in one of two ways. The simplest method is to generate the catalyst in-situ by sequentially introducing the catalyst components to the polymerization solution. It is usually most effective to introduce the aluminum alkyl components first, thereby scavenging impurities from the premix prior to contact with the neodymium salt. The other method for catalyst preparation is to preform the catalyst components prior to introducing them into the polymerization vessel. The most common practice involves sequentially treating the catalyst components in the presence of at least a few equivalents of monomer followed by an aging period. For example U.S. Pat. No. 3,794,604 discloses an improved preforming technique which is carried out in the presence of a small portion of a conjugated diene.

Aging the catalyst components with a diene prior to polymerization results in a more active catalyst than when the conjugated diene is absent. The disclosed technique for catalyst formation is to age after all of the components have been mixed together. U.S. Pat. No. 4,429,089 also teaches the use of a diolefin during catalyst formation and states that the particular procedure which is followed has no bearing on the polymerization run. Likewise, U.S. Pat. No. 4,461,883 discloses that the use of a conjugated diene in the catalyst make-up is preferable for improving the activity of the catalyst. In this example, the diene is mixed with the catalyst components at any time in the preforming step with aging occurring after all components are mixed together.

U.S. Pat. No. 4,533,711 teaches the practice of adding the catalyst components together first followed by the addition of a small amount of diene and then aging the preformed catalyst. This patent states that the diene is not essential in the make-up but it does serve to increase catalyst activity. U.S. Pat. No. 4,663,405 continues to teach the use of conjugated dienes as components in preformed catalysts. It goes on to state that soluble catalysts result when diolefins are present in the make-up while insoluble catalysts frequently result when no diene is present. This patent teaches a process where aging of the catalyst occurs after the reagents are added.

U.S. Pat. No. 5,502,126 again practices the use of a diene in the preformed catalyst make-up and again states that it is preferred to age the catalyst after the labile halogen compound is added. In U.S. Pat. No. 5,659,101 the use of a diolefin in conjunction with a boron derived halogen source results in a preformed catalyst that partially forms a solid precipitate in aliphatic solvents.

When silicone halides are used, as in U.S. Pat. No. 5,686,371, aging in the presence of a diene again is performed after the addition of all the catalyst components. U.S. Pat. No. 6,136,931 discloses an improved boron halide dependent preformed catalyst that has excellent solubility in non-polar solvents. Finally, U.S. Pat. No. 6,255,416 also practice preformed catalyst generation in the presence of a small amount of diene. Aging in this case again occurs after all of the catalyst components are mixed.

SUMMARY OF THE INVENTION

The technique of combining a neodymium salt, an aluminum alkyl, a halide source, and a diene to attain an improved result is the subject of this invention. As the prior art describes, almost any conjugated diene monomer can be used in the preforming step, and that each diene can be treated in the same way. For example, prior teachings imply that the contact time between the conjugated diene and the neodymium/aluminum co-catalyst treatment step is not crucial and that aging should occur after the halide source has been added. However, we have now found that a minimum contact time does indeed exist for different conjugated dienes when the preparation of a completely soluble catalyst is desired. It is also crucial that this contact time occurs prior to the introduction of a halide source in order to ensure completely soluble catalyst solutions. For example, formation of a homogeneous catalyst solution is achieved when isoprene is used in the preform only if the isoprene/neodymium/aluminum alkyl solution is allowed to age for an extended amount of time prior to aluminium-chloride addition. If the first step is not allowed to proceed long enough, a precipitate is formed upon addition of aluminum-chloride. When butadiene is used in the preforming reaction this first aging period is still crucial, yet, significantly less time is needed to ensure a homogenous catalyst.

The technological advantage of a completely soluble preformed catalyst has previously been appreciated. As U.S. Pat. No. 4,461,883 teaches, a heterogeneous system is a disadvantage in an industrial setting. Likewise, U.S. Pat. No.

6,136,931 states that the use of heterogeneous catalyst systems containing suspended particles usually produces gel. This patent also states a heterogeneous system, compared to a homogenous one, is more difficult to control the exact amount of catalyst added during the polymerization. Similarly, we have found that catalyst prepared without the first aging period results in a catalyst suspension of a fine precipitate. This suspension settles upon standing into two phases. If the resulting supernate, or top layer, is used to polymerize a conjugated diene, extremely inefficient catalyst activity results. Catalyst activity can be restored in these systems only after agitation of the by-phasic mixtures. This allows for the introduction of a heterogeneous catalyst suspension to the monomer to be polymerized. However, it is now possible to ensure consistent and highly active soluble preformed catalyst formation by utilizing the appropriate two step aging technique. This is of obvious technological advantage, since there would be no need to use a stirred tank catalyst storage tank or other engineering constraints to ensure consistent catalyst suspensions.

The neodymium catalyst system prepared by the technique of this invention can be used in the polymerization of isoprene monomer into polyisoprene rubber that is clear (transparent) and of high purity. This invention more specifically discloses a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

DETAILED DESCRIPTION OF THE INVENTION

The neodymium catalyst system of this invention can be used in the polymerization of isoprene monomer into polyisoprene rubber that is clear and of high purity. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations that utilize the catalyst systems of this invention, there will normally be from 5 to 35 weight percent isoprene monomer in the polymerization medium. Such polymerization mediums are, of course, comprised of an organic solvent, the isoprene monomer, and the catalyst system. In most cases, it will be preferred for the polymerization medium to contain from 10 to 30 weight percent isoprene monomer. It is generally more preferred for the polymerization medium to contain 12 to 18 weight percent isoprene monomer.

The neodymium catalyst system used in the process of this invention is made by preforming three catalyst components. These components are (1) an organoaluminum compound, (2) a neodymium carboxylate, and (3) a dialkyl aluminum chloride. In making the neodymium catalyst system the neodymium carboxylate and the organoaluminum compound are first reacted together for 10 minutes to 30 minutes in the presence of isoprene to produce a neodymium-aluminum catalyst component. The neodymium carboxylate and the organoaluminum compound are preferable reacted for 15 minutes to 25 minutes.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system can be aged for much longer time periods before being used with out any detrimental results.

The neodymium catalyst system will typically be preformed at a temperature that is within the range of about −10° C. to about 60° C. The neodymium catalyst system will more typically be prepared at a temperature that is within the range of about 0° C. to about 30° C. The neodymium catalyst system will preferably be prepared at a temperature that is within the range of about 5° C. to about 15° C. The period of time needed for the catalyst to be preformed is increased by utilizing lower temperatures.

In a highly preferred embodiment of this invention the dialkyl aluminum chloride is slowly added to the neodymium-aluminum catalyst component over a period of at least 30 minutes. The dialkyl aluminum chloride is preferable slowly added to the neodymuim-aluminum catalyst component over a period of at least 45 minutes and is most preferable added over a period of at least 60 minutes. By slowly adding the dialkyl aluminum chloride to the neodymium-aluminum catalyst component over an extended period of time the first step of the process wherein the neodymium carboxylate is reacted with the organoaluminum compound is much more forgiving. More specifically, the reaction time need for the first step is not as critical and can be reduced to as short of a period as 1 minute or extended to a period as long as 12 hours at low temperatures. In this embodiment of the subject invention the neodymium carboxylate will preferable be allowed to react with the organoaluminum compound in the presence of isoprene for a period of 2 hours to 8 hours at a temperature which is within the range of 0° C. to 30° C. In this embodiment of the subject invention the neodymium carboxylate will more preferable be allowed to react with the organoaluminum compound in the presence of isoprene for a period of 4 hours to 6 hours at a temperature which is within the range of 5° C. to 15° C.

The organoaluminum compound contains at least one carbon to aluminum bond and can be represented by the structural formula:

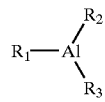

in which $R_1$ is selected from the group consisting of alkyl (including cycloalkyl), alkoxy, aryl, alkaryl, arylalkyl radicals and hydrogen: $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n- propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as –60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization can be terminated by the addition of an alcohol or another protic source, such as water. Such a termination step results in the formation of a protic acid. However, it has been unexpectedly found that better color can be attained by utilizing an alkaline aqueous neutralizer solution to terminate the polymerization. Another advantage of using an alkaline aqueous neutralizer solution to terminate the polymerization is that no residual organic materials are added to the polymeric product.

Polymerization can be terminated by simply adding an alkaline aqueous neutralizer solution to the polymer cement. The amount of alkaline aqueous neutralizer solution added will typically be within the range of about 1 weight percent to about 50 weight percent based upon the weight of the polyisoprene cement. More typically, the amount of the alkaline aqueous neutralizer solution added will be within the range of about 4 weight percent to about 35 weight percent based upon the weight of the polyisoprene cement. Preferable, the amount of the alkaline aqueous neutralizer solution added will be within the range of about 5 weight percent to about 15 weight percent based upon the weight of the polyisoprene cement.

The alkaline aqueous neutralizer solution will typically have a pH which is within the range of 7.1 to 9.5. The alkaline aqueous neutralizer solution will more typically have a pH which is within the range of 7.5 to 9.0, and will preferable have a pH that is within the range of 8.0 to 8.5. The alkaline aqueous neutralizer solution will generally be a solution of an inorganic base, such as a sodium carbonate, a potassium carbonate, a sodium bicarbonate, a potassium bicarbonate, a sodium phosphate, a potassium phosphate, and the like. For instance, the alkaline aqueous neutralizer solution can be a 0.25 weight percent solution of sodium bicarbonate in water. Since the alkaline aqueous neutralizer solution is not soluble with the polymer cement it is important to utilize a significant level of agitation to mix the alkaline aqueous neutralizer solution into throughout the polymer cement to terminate the polymerization. Since the alkaline aqueous neutralizer solution is not soluble in the polymer cement it will readily separate after agitation is discontinued.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

This example serves to demonstrate the ability to form soluble catalyst solutions by utilizing a technique wherein the addition of the dialkyl aluminum chloride to the neodymium-aluminum catalyst component is delayed. In the procedure utilized a homogeneous neodymium-aluminum catalyst component was prepared by treating a solution of neodymium versatate in hexane with 18 molar equivalents of diisobutyl aluminum hydride in the presence of 30 equivalents of isoprene. This mixture was allowed to age for a minimum of 15 minutes at 23° C. resulting in a clear green solution. Then, 2.3 equivalents of diethyl aluminum chloride was added to the solution and allowed to age for 30 minutes and a clear golden-green catalyst solution formed.

The catalyst solution made was then used to polymerize isoprene monomer into polyisoprene rubber. In the procedure used a 15 weight percent solution of isoprene monomer in hexane was treated with the aged catalyst such that the ratio of neodymium to isoprene was 0.15 mmoles of neodymium per hundred grams of isoprene. The polymerization vessel was then heated to 65° C. and maintained at that temperature for 3 hours after which time the reaction was terminated with a protic alcohol. After the polymerization had been terminated the polyisoprene rubber made was stabilized by adding a phenolic antioxidant. The polyisoprene rubber was then recovered and the monomer conversion was determined to be greater than 95 percent.

EXAMPLE 2

This example demonstrates the process improvement that can be realized by the delayed addition of the dialkyl aluminum chloride to the neodymium-aluminum catalyst component. In the procedure used in this example an insoluble neodymium-aluminum catalyst component was prepared by treating a solution of neodymium versatate in hexane with 18 molar equivalents of diisobutyl aluminum hydride in the presence of 30 equivalents of isoprene. This mixture was allowed to age for just 2 minutes at 23° C. which resulted in the formation of a clear blue solution. Then, 2.3 equivalents of diethyl aluminum chloride is added to the solution and allowed to age for 30 minutes which resulted in the formation of a cloudy heterogeneous catalyst solution. Upon standing this solution settled into two phases, a clear supernatant top layer and a bottom layer containing a fine precipitate.

Isoprene monomer was polymerized with the catalyst made using the polymerization procedure described in Example 1. Polymerization that was initiated with the top layer of catalyst resulted in a conversion of only 17 percent after 3 hours of polymerization time at a temperature of 65° C. However, shaking the catalyst mixture to form a suspension prior to use resulted in a monomer conversion of greater than 95% after 3 hours of polymerization time at 65° C.

EXAMPLE 3

This example serves to demonstrate the unexpected and significant differences that exist between aging in the presence of 1,3-butadiene as opposed to isoprene. In the procedure used in this example an insoluble neodymium-aluminum catalyst component was prepared by treating a solution of neodymium versatate in hexane with 18 molar equivalents of diisobutyl aluminum hydride in the presence of 30 equivalents of isoprene. This mixture was allowed to age for just 2 minutes at 23° C. which resulted in the formation of a clear green solution. Then, 2.3 equivalents of diethyl aluminum chloride is added to the solution and allowed to age for 30 minutes which resulted in the formation of a clear golden green catalyst solution.

The catalyst made was then used to polymerize isoprene monomer. In the polymerization procedure used the aged catalyst was added to a 15 weight percent solution of isoprene in hexane with the ratio of neodymium to isoprene being 0.15 mmoles of neodymium per hundred grams of isoprene. The polymerization vessel was heated to 65° C. and maintained at that temperature for 3 hours. Then the polymerization reaction was terminated with by addition of a protic alcohol and the polymer was stabilized with a phenolic antioxidant. The polymer was then recovered from the polymer cement and the monomer conversion was determined to be greater than 95%.

EXAMPLE 4

This example illustrates the process improvement that results from employing a technique wherein the addition of the dialkyl aluminum chloride to the neodymium-aluminum catalyst component is delayed. In the procedure used in this example an insoluble neodymium-aluminum catalyst component was prepared by treating a solution of neodymium versatate in hexane with 18 molar equivalents of diisobutyl aluminum hydride in the presence of 30 equivalents of isoprene. This mixture was allowed to age for 30 seconds at 23° C. and a clear blue solution formed. To this solution, 2.3 equivalents of diethyl aluminum chloride is added and allowed to age for 30 minutes resulting in a cloudy heterogeneous catalyst solution. Upon standing this solution settled into two phases, a clear supernatant top layer and a bottom layer containing a fine precipitate.

The top layer of catalyst was used to polymerize isoprene monomer as described in Example 3. This resulted in a conversion of only 33 percent after 3 hours at 65° C. Shaking the catalyst mixture to form a suspension prior to use resulted in a conversion of greater than 95% after 3 hours at 65° C.

EXAMPLE 5

This example serves to demonstrate the ability to form soluble catalyst solutions by utilizing the delayed addition of aluminum chloride technique.

Preparation of a homogeneous neodymium catalyst with isoprene: neodymium versatate in hexane was treated with 18 molar equivalents of triisobutylaluminum in the presence of 30 equivalents of isoprene. This mixture was allowed to age for a minimum of 15 minutes at 23° C. resulting in a clear green solution. To this solution, 2.3 equivalents of diethyl aluminum chloride was added and allowed to age for 30 minutes resulting in a clear gold catalyst solution.

EXAMPLE 6

This example serves to demonstrate the time dependence in the delayed addition of aluminum chloride technique.

Preparation of an insoluble neodymium catalyst with isoprene: neodymium versatate in hexane was treated with 18 molar equivalents of triisobutylaluminum in the presence of 30 equivalents of isoprene. This mixture was allowed to age for 5 minutes at 23° C. resulting in a cloudy blue/green mixture. To this mixture, 2.3 equivalents of diethyl aluminum chloride is added and allowed to age for 30 minutes resulting in a cloudy heterogenous catalyst mixture.

EXAMPLE 7

This example serves to demonstrate the normalizing effect a long addition of aluminum chloride has on the time dependent formation of homogeneous catalyst solutions.

Preparation of soluble neodymium catalysts with isoprene: three different catalysts were prepared in three separate 100 ml glass bottles by treating 1.0 ml of a 0.51 M neodymium versatate in hexane solution with 18 molar equivalents of 25 weight percent of a solution of triisobutylaluminum (TIBA) in hexane in the presence of 30 equivalents of isoprene. The three mixtures were allowed to age with stirring at 5° C. for 1 hour, 2 hours, and 3 hours, respectively, resulting in a cloudy blue mixture, a cloudy aqua mixture and a cloudy green mixture. To the different mixtures, 2.3 equivalents of 25 weight percent diethyl aluminum chloride in hexane solution was added in small portions over a 2 hour period resulting in soluble clear golden green catalyst solutions in all cases.

Polymerization of isoprene was performed using the above catalysts as follows: a 15 weight percent isoprene/hexane solution was treated with the catalysts in 100 ml glass bottles such that the ratio of neodymium to isoprene was 0.15 mmoles of neodymium per hundred grams of isoprene. The polymerization vessels were heated to 65° C. for 3 hours after which time the reactions were terminated with a protic alcohol and stabilized with a phenolic antioxidant. Recovery of the polymers showed greater than 95% conversion in all cases.

EXAMPLE 8

This example serves to demonstrate the time dependence of soluble catalyst formation when the aluminum chloride is added in one portion.

Preparation of an insoluble neodymium catalyst with isoprene: neodymium versatate in hexane was treated with 18 molar equivalents of triisobutylaluminum in the presence of 30 equivalents of isoprene following the procedure in Example 7. This mixture was allowed to age for 1 hour at 5° C. resulting in a cloudy blue mixture. To this mixture, 2.3 equivalents of diethyl aluminum chloride was added in one portion resulting in a cloudy heterogenous golden green catalyst mixture.

EXAMPLE 9

This example serves to demonstrate the normalizing effect a long addition of aluminum chloride has on the time dependent formation of homogeneous catalyst solutions.

Preparation of soluble neodymium catalysts with isoprene: neodymium versatate in hexane was treated with 18 molar equivalents of triisobutylaluminum in the presence of 30 equivalents of isoprene following the procedure in Example 7. This mixture was allowed to age at 25° C. for 20 minutes resulting in a cloudy blue/green mixture. To this mixture 2.3 equivalents of diethyl aluminum chloride was added in small portions over a 1 hr period resulting in a soluble clear golden catalyst solution.

EXAMPLE 10

This example serves to demonstrate the time dependence of soluble catalyst formation when the aluminum chloride is added in one portion.

Preparation of an insoluble neodymium catalyst with isoprene: neodymium versatate in hexane was treated with 18 molar equivalents of triisobutylaluminum in the presence of 30 equivalents of isoprene following the procedure in Example 7. This mixture was allowed to age for 20 minutes at 25° C. resulting in a cloudy blue/green mixture. To this mixture, 2.3 equivalents of diethyl aluminum chloride was added in one portion resulting in a cloudy heterogenous golden catalyst mixture.

EXAMPLE 11

This example serves to demonstrate the time dependence of soluble catalyst formation when the aluminum chloride is added in one portion.

Preparation of a soluble neodymium catalyst with isoprene: neodymium versatate in hexane was treated with 18 molar equivalents of triisobutylaluminum in the presence of 30 equivalents of isoprene following the procedure in Example 7. This mixture was allowed to age for 1 hour at 25° C. resulting in a clear green solution. To this mixture, 2.3 equivalents of diethyl aluminum chloride was added in one portion resulting in a soluble clear golden catalyst solution.

EXAMPLE 12

This example serves to demonstrate the normalizing effect a long addition of aluminum chloride has on the time dependent formation of homogeneous catalyst solutions utilizing just a 20 minute first step.

In this procedure 330 grams of a 25 weight percent TIBA/hexane solution was charged into a 1 liter reactor that had been purged with nitrogen. Then, 50 grams of isoprene was charged into the reactor. The contents were cooled down to 5° C. and with stirring provided by an anchor stirrer at 150 rpm. When the temperature reached steady state, 40 grams of a 9 weight percent solution of neodymium versatate in hexane was rapidly injected into the reactor and the contents turned cloudy blue. Then, 20 minutes after the neodymium versatate addition, 27 grams of a 25 weight percent diethyl aluminum chloride in hexane solution was added according to the following table.

| Additions | Time (minutes) | DEAC Amount (g) |
|---|---|---|
| 1 | 0 | 3.0 |
| 2 | 30 | 2.0 |
| 3 | 60 | 1.0 |
| 4 | 90 | 0.5 |
| 5 | 120 | 0.5 |
| 6 | 150 | 1.0 |
| 7 | 180 | 2.0 |
| 8 | 210 | 3.0 |
| 9 | 240 | 14.0 |

The temperature was maintained at 5° C. throughout the entire process. The cloudy blue solution eventually turned cloudy green just after the second diethyl aluminum chloride addition and clear green after the third diethyl aluminum chloride addition. The finished soluble catalyst had a greenish gold color.

EXAMPLE 13

This example serves to demonstrate the normalizing effect a long addition of aluminum chloride has on the time dependent formation of homogeneous catalyst solutions utilizing a 3 hour first step.

Then, 330 grams of a 25 weight percent TIBA/hexane solution was charged into a 1 liter reactor that was previously purged with nitrogen. Then 50 grams of isoprene was charged into the reactor. The contents were cooled down to 5° C. and with stirring provided by an anchor stirrer at 150 rpm. When the temperature reached steady state, 40 grams of a 9 weight percent solution of neodymium versatate in hexane was rapidly injected into the reactor and the contents immediately turned cloudy blue. The contents took on a slightly hazy green color 3 hours after the neodymium versatate addition. Then, 27 grams of a 25 weight percent solution of diethyl aluminum chloride in hexane was added according to the procedure as described in Example 12. The temperature was maintained at 5° C. throughout the whole process. The hazy green color turned clear immediately after the first diethyl aluminum chloride addition. The finished soluble catalyst had a greenish gold color.

EXAMPLE 14

This example serves to demonstrate the normalizing effect a long addition of aluminum chloride has on the time dependent formation of homogeneous catalyst solutions utilizing an 18 hour first step.

In the procedure used 330 grams of a 25 weight percent TIBA/hexane solution was charged into a 1 liter reactor that had been previously purged with nitrogen. Then, 250 grams of a 20 weight percent isoprene in hexane solution was charged into the reactor. The contents were cooled to a temperature of 5° C. with stirring being provided with an anchor stirrer that was operated at 150 rpm. When the temperature reached steady state, 20 grams of a 9 weight percent solution of neodymium versatate in hexane was rapidly injected into the reactor and the contents immediately turned to cloudy blue color. After 2 hours, the contents were cloudy green. Then, another 20 grams of the 9 weight percent neodymium versatate solution was rapidly injected into the reactor. The contents remained cloudy green visually. Stirring was maintained at 150 rpm for an additional hour and the agitation was then turned off. The contents then had a cloudy green appearance and were kept at 5° C. over night (approximately 18 hours). A clear green solution was observed on the following morning. Then, 27 grams of a 25 weight percent solution of diethyl aluminum chloride in hexane was added according to the procedure as described in example 12. The temperature was maintained at 5° C. throughout the entire process. The finished soluble catalyst had a greenish gold color.

Polymerization of isoprene was performed using the three catalysts from Examples 12–14 as follows: a 15 weight percent isoprene/hexane solution was treated with the catalysts in 100 ml glass bottles such that the ratio of neodymium to isoprene was 0.15 mmoles of neodymium per hundred grams of isoprene. The polymerization vessels were heated to 65° C. for 3 hours after which time the reactions were terminated with a protic alcohol and stabilized with a phenolic antioxidant. Recovery of the polymers showed greater than 95% conversion in all cases.

EXAMPLE 15

In carrying out this experiment, three bottles of polyisoprene cement were initially prepared. In the procedure used 350 grams of a 10 weight percent solution of isoprene in hexane that was previously dried over silica gel was transferred into capped quart polymerizatgion bottles that had been oven baked and purged with nitrogen. Then, 2.9 mls of a 0.026M preformed catalyst solution comprised of neodymium versatate, triisobutyl aluminum, isoprene and diethyl aluminum chloride in hexane (mole ratios Nd:Al:isoprene:Cl=1:15:30:2.3) was injected into each of the bottles. The caps of the bottles were then replaced and the bottles were placed in a water bath that was maintained at a temperature of 65° C. for four hours. The bottles were then removed from the water bath and the active catalyst was then terminated as described in the following table.

| Bottle | Terminator | Amount |
|---|---|---|
| 1 | 2-ethyl-1-hexanol | 0.36 ml |
| 2 | 0.25 wt % NaHCO$_3$ aqueous buffer solution | 35 g |
| 3 | water | 35 g |

Then, 0.6 mls of a 10 weight percent Irganox-565/toluene solution was injected each of the bottles. All three bottles were placed on a shaker for 30 minutes. The contents were drained from the bottles into drying pans. Excess water was decanted from the cement. The cement samples were placed in a hood over night to remove the hexane and then in a 70° C. vacuum oven for 8 hours, after which no additional weight loss was observed. Complete monomer conversion was achieved in all three bottles.

Four 3 grams samples from each bottle were placed on aluminum pans in a forced air oven that was maintained at a temperature of 90° C. One set of heat aged samples was removed from the oven each day for a total duration of 4 days. The polyisoprene samples made by polymerizations that were terminated with the alkaline water exhibited low color. This is in contract to polyisoprene rubber samples that were made by polymerizations that were terminated alcohol which were yellow in color.

EXAMPLE 16

Cement was produced by a continuous reactor chain that was comprised of two 25 gallon reactors and one 50 gallon reactor. 150 lbs/hr of a 14 weight percent isoprene/hexane solution and 0.76 lbs/hr of a 0.03M preformed catalyst were continuously fed to the reactor chain. The catalyst was comprised of neodymium versatate, triisobutyl aluminum, isoprene and diethyl aluminum chloride and hexane at mole ratios Nd:Al:isoprene:Cl=1:17:30:2.3.

The catalyst was continuously terminated by mixing the 150 lbs/hr cement with 15 lbs/hr of a 0.25 weight percent NaHCO$_3$ aqueous neutralizer solution. Because of the fact that cement and the aqueous neutralizer solution are immiscible, an IKA mixer (model 2000/4) operating at 20 Hz at a variable frequency device was used to achieve intimate mixing. A 2 weight percent Irganox-565/toluene solution was continuously charged at a rate of 1.56 lbs/hr to the terminated cement. The terminated and stabilized cement was then steam stripped to remove the hexane and extruder finished to remove the water. A 3 gram sample from each bottle was placed on aluminum pans in a forced air oven that was maintained at a temperature of 90° C. for three days. The polyisoprene samples made by polymerizations that were terminated with the alkaline water exhibited low color. This is in contract to polyisoprene rubber samples that were made by polymerizations that were terminated alcohol which were yellow in color.

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

2. A process as specified in claim 1 wherein the neodymium catalyst is prepared at a temperature that is within the range of about 0° C. to about 100° C.

3. A process as specified in claim 2 wherein the mole ratio of the organoaluminum compound to the neodymium carboxylate is within the range of about 4/1 to about 200/1.

4. A process as specified in claim 2 wherein the organoaluminum compound is selected from the group consisting of trialkylaluminum compounds and dialkylaluminum hydride compounds.

5. A process as specified in claim 3 wherein the molar ratio of the dialkyl aluminum chloride to neodymium is within the range of about 0.5:1 to about 3.5:1.

6. A process as specified in claim 4 wherein the mole ratio of the organoaluminum compound to the neodymium carboxylate is within the range of about 10/1 to about 50/1.

7. A process as specified in claim 2 wherein the polymerization is conducted in an organic solvent.

8. A process as specified in claim 7 wherein the polymerization is carried out at a temperature within the range of about 10° C. to about 90° C.

9. A process as specified in claim 2 wherein said organoaluminum compound is selected from the group consisting of diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolyethylalumin hydride, p-tolyl-n-propylaluminum hydride, p-tolylisopropylaluminum hydride, benzylethylaluminum hydride, benzyl-n-propylaluminum hydride, benzylisopropylaluminum hydride, ethylaluminum dihydride, butylaluminum dihydride, isobutylaluminum dihydride, octylaluminum dihydride, amylaluminum dihydride, trimethylaluminum, triethylaluminum, tri-n-propylaluminum, triisopropylaluminum, tri-n-propylaluminum, triisopropylaluminum, tri-n-butylaluminum, triisobutylaluminum, tripentylaluminum, trihexylaluminum, trioctylaluminum, triphenylaluminum, tri-p-tolylaluminum, tribenylaluminum, ethyldiphenylaluminum, ethyl-di-p-tolylaluminum, ethyldibenzylaluminum, diethylphenylaluminum, diethyl-p-tolylaluminum, and diethylbenzylaluminum.

10. A process as specified in claim 9 wherein the dialkyl aluminum chloride is selected from the group consisting of dimethyl aluminum chloride, diethylaluminum chloride, dipropylaluminum chloride, dihexylaluminum chloride, diisobutylaluminum chloride, and didodecyaluminum chloride.

11. A process as specified in claim 4 wherein the molar ratio of isoprene monomer to neodymium ranges from about 5/1 to about 500/1.

12. A process as specified in claim 10 wherein the neodymium carboxylate is selected from the group consisting of neodymium octoate, neodymium neodecanoate, and neodymium 2-ethyl hexanoate.

13. A process as specified in claim 1 wherein after the catalyst is aged in step(2) but prior to the polymerization of isoprene, additional organoaluminum compound is added to the aged catalyst.

14. A process as specified in claim 1 wherein the polymerization is terminated by the addition of an alkaline aqueous neutralizer solution.

15. A process as specified in claim 14 wherein the alkaline aqueous neutralizer solution is an aqueous solution of sodium bicarbonate.

16. A process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 1 minutes to about 12 hours to produce neodymium-aluminum catalyst component, and (2) subsequently reacting the neodymium-aluminum catalyst component with a dialkyl aluminum chloride for a period of at least 30 minutes to produce the neodymium catalyst system, wherein the dialkyl aluminum chloride is added to the neodymium-aluminum catalyst component over a period of at least 30 minutes.

17. A process as specified in claim 16 wherein the polymerization is terminated by the addition of an alkaline aqueous neutralizer solution.

18. A process as specified in claim 17 wherein the neodymium carboxylate is reacted with the organoaluminum compound in the presence of isoprene for a period of 2 hours to about 8 hours at a temperature which is within the range of 0° C. to 30° C. to produce the neodymium-aluminum catalyst component.

19. A process as specified in claim 17 wherein the neodymium carboxylate is reacted with the organoaluminum compound in the presence of isoprene for a period of 4 hours to about 6 hours at a temperature which is within the range of 5° C. to 15° C. to produce the neodymium-aluminum catalyst component.

20. A process as specified in claim 18 wherein the dialkyl aluminum chloride is added to the neodymium-aluminum catalyst component over a period of at least 45 minutes.

21. A process as specified in claim 19 wherein the dialkyl aluminum chloride is added to the neodymium-aluminum catalyst component over a period of at least 60 minutes.

22. A process as specified in claim 21 wherein the alkaline aqueous neutralizer solution is an aqueous solution of sodium bicarbonate.

23. A process as specified in claim 22 wherein the alkaline aqueous neutralizer solution has a pH within the range of 7.1 to 9.5.

24. A process as specified in claim 22 wherein the alkaline aqueous neutralizer solution has a pH within the range of 7.5 to 9.0.

25. A process as specified in claim 22 wherein the alkaline aqueous neutralizer solution has a pH within the range of 8.0 to 8.5.

* * * * *